United States Patent
Suzuki

(10) Patent No.: US 11,219,834 B2
(45) Date of Patent: Jan. 11, 2022

(54) SERVER DEVICE, METHOD FOR CONTROLLING THE SAME, AND COMPUTER-READABLE RECORDING MEDIUM

(71) Applicant: GREE, INC., Tokyo (JP)

(72) Inventor: Koichi Suzuki, Tokyo (JP)

(73) Assignee: GREE, INC., Tokyo (JP)

( * ) Notice: Subject to any disclaimer, the term of this patent is extended or adjusted under 35 U.S.C. 154(b) by 0 days.

(21) Appl. No.: 16/712,661

(22) Filed: Dec. 12, 2019

(65) Prior Publication Data

US 2020/0114269 A1 Apr. 16, 2020

Related U.S. Application Data

(63) Continuation of application No. 14/316,656, filed on Jun. 26, 2014, now Pat. No. 10,537,813.

(30) Foreign Application Priority Data

Jun. 28, 2013 (JP) .................................. 2013-136890
Nov. 11, 2013 (JP) .................................. 2013-232978

(51) Int. Cl.
 A63F 13/822 (2014.01)
 A63F 13/795 (2014.01)
(52) U.S. Cl.
 CPC .......... *A63F 13/822* (2014.09); *A63F 13/795* (2014.09)
(58) Field of Classification Search
 CPC ........................... A63F 13/822; A63F 13/795
 See application file for complete search history.

(56) References Cited

U.S. PATENT DOCUMENTS 9,005,032 B1 * 4/2015 Curtis ..................... A63F 13/30
 463/42
10,537,813 B2 * 1/2020 Suzuki .................. A63F 13/822
 (Continued)

FOREIGN PATENT DOCUMENTS

| JP | 2013-066524 A | 4/2013 |
|----|---------------|--------|
| JP | 5618434 B1    | 11/2014 |
| JP | 2015-8918 A   | 1/2015 |

OTHER PUBLICATIONS

How to Charter People to Start a Guild in "WoW": World of Warcraft Tutorials. Youtube.com. Online. May 28, 2013. Accessed via the Internet. Accessed Dec. 22, 2016. <URL: https://www.youtube.com/watch?v=0YveR1 ivfjs> (Year: 2013).*

(Continued)

*Primary Examiner* — Thomas J Hong
*Assistant Examiner* — Carl V Larsen
(74) *Attorney, Agent, or Firm* — Oblon, McClelland, Maier & Neustadt, L.L.P.

(57) ABSTRACT

Provided is a social game capable of, when a new group is created, allowing such a group to progress a game smoothly. A server device that provides a game, in which a plurality of players can participate, is connected to terminal devices operated by the players via a communication line, and comprises: an information storage unit; and a control unit. The information storage unit stores information on a first group, in which the players participate, and information on a second group, in which the players are supposed to participate; the control unit receives notification on acceptance of participation in the second group from the terminal devices, and when it is determined that the number of players in the second group reaches a certain number, stores the second group as a new first group at the information storage unit.

18 Claims, 12 Drawing Sheets

(56) References Cited

U.S. PATENT DOCUMENTS

| | | | | |
|---|---|---|---|---|
| 2009/0318235 | A1* | 12/2009 | Ashida | A63F 13/12 |
| | | | | 463/42 |
| 2012/0122587 | A1* | 5/2012 | Kelly | A63F 13/80 |
| | | | | 463/42 |
| 2013/0137522 | A1* | 5/2013 | Kusano | A63F 13/335 |
| | | | | 463/42 |
| 2013/0210527 | A1* | 8/2013 | Kim | A63F 13/795 |
| | | | | 463/42 |
| 2013/0249928 | A1* | 9/2013 | Buhr | G06Q 30/02 |
| | | | | 345/589 |
| 2013/0254278 | A1 | 9/2013 | Buhr | |
| 2013/0254680 | A1 | 9/2013 | Buhr | |
| 2014/0342798 | A1 | 11/2014 | Fujisawa | |

OTHER PUBLICATIONS

Tell. Wowwiki.wikia.com. Online. Jun. 25, 2010 Accessed via the Internet. Accessed Sep. 26, 2020. <URL: https://wowwiki.fandom.com/wiki/Tell?oldid=2302475> (Year: 2010).*
Who List. Wowwiki.wikia.com. Online. Dec. 21, 2012. Accessed via the Internet. Accessed Sep. 26, 2020. <URL: https://wowwiki.fandom.com/wiki/Who_List?oldid=2628897> (Year: 2012).*
World of Warcraft. Wikipedia.org. Online. May 11, 2013. Accessed via the Internet. Accessed Dec. 22, 2016. <URL: http://wayback.archive.org/web/20130511 011629/http://en.wikipedia.org/wiki/World_of_Warcraft> (Year: 2013).*
Creating A Guild In World of Warcraft. Thegoldencrusade.net. Online. Nov. 25, 2013. Accessed via the Internet. Accessed Dec. 22, 2016. <URL: http://wayback.archive.org/web/20131125160810/http://thegoldencrusade.net/guides/creating-a-guild-in-world-of-warcraft/>_ (Year: 2013).*
Guild. Wowwiki.wikia.com. Online. Aug. 26, 2012. Accessed via the Internet. Accessed Sep. 26, 2020. <URL: https://wowwiki.fandom.com/wiki/Guild?oldid=2596620> (Year: 2012).*
Partial English translation of Notice of Reasons for Rejection of Japanese parent application No. JP2013-136890 dated Feb. 10, 2014, with cited reference in Japanese language (TERA The Exiled Realm of Arborea, Monthly Famitsu Connect!On, vol. 2, No. 1, Enterbrain Inc., Nov. 26, 2011, vol. 2, pp. 130-133), 7 pages total.
Japanese Patent Office, Notification of Reasons for Refusal of related Japanese patent application No. JP2014-186783, with English translation, dated Jan. 6, 2015, 4 pages.
Office Action issued in related application JP 2015-144699, dated Aug. 30, 2016, with English language translation, 8 pages.
Office Action issued in related application JP 2016-224104, dated Jan. 17, 2017, with English language translation, 6 pages.

Office Action dated May 7, 2019, in corresponding Japanese Patent Application No. 2018-113855 (with English-language translation). Large cooperatives! Odin Battle, Major Summary! gloops Magazine, Inc., pp. 30 to 36, and pp. 2012 to 2031, Pages to, and pp. 1 to 3 Mobage (with partial English-language translation).
Continental cosmonautics, GameOn completed guide GameOn Complete Guide, Inc., Oct. 1, 2006, pp. 8-9 (documents showing well-known arts), PP. (documents showing well-known arts) (with partial English-language translation).
EverQuest II EVER QUEST II,LOGiN , vol. 24, No. 8, Inc., Aug. 1, 2005, vol. 24, pp. 3-4 (documents showing well-known arts) (with partial English-language translation).
New function is added to the Guild system, Aug. 17, 2019, [online], Apr. 12, 2016, and URL,https://www.4gamer.net/games/124/G012492/20120817106 / 4Gamer.net,2012 I search ; / Varie (with partial English-language translation).
How to Charter People to Start a Guild in "WoW": World of Warcraft Tutorials. Youtube.com. Online. May 28, 2013. Accessed via the Internet. Accessed Dec. 22, 2016. <URL: https://www.youtube.com/watch?v=0YveR1 ivfjs>.
Tell. Wowwiki.wikia.com. Online. Accessed via the Internet. Accessed Dec. 22, 2016. <URL: http://wowwiki.wikia.com/wiki/Tell>.
Who List. Wowwiki.wikia.com. Online. Accessed via the Internet. Accessed Dec. 22, 2016-12-22. <URL: http://wowwiki.wikia.com/wiki/Who_List>.
Power-up. Wikipedia.org. Online. Apr. 2, 2013. Accessed via the Internet. Accessed Dec. 22, 2016. <URL: http://wayback.archive.org/web/20130402022124/http://en.wikipedia.org/wiki/Power-up>.
Ultimate Marvel vs. Capcom 3. Wikipedia.org. Online. Accessed via the Internet. Accessed Dec. 22, 2016. <URL: https://en.wikipedia.org/wiki/Ultimate_Marvel_vs._Capcom_3>.
World of Warcraft. Wikipedia.org. Online. May 11, 2013. Accessed via the Internet. Accessed Dec. 22, 2016. <URL: http://wayback.archive.org/web/20130511 011629/http://en.wikipedia.org/wiki/World_of_Warcraft>.
Creating A Guild In World of Warcraft. Thegoldencrusade.net. Online. Nov. 25, 2013. Accessed via the Internet. Accessed Dec. 22, 2016. <URL: http://wayback.archive.org/web/20131125160810/http://thegoldencrusade.net/guides/creating-a-guiid-in-world-of-warcraft/>.
Guild. Wowwiki.wikia.com. Online. Accessed via the Internet. Accessed Dec. 22, 2016. <URL: http://wowwiki.wikia.com/wiki/Guild>.
Character Info . Wowwiki.wikia.com. Online. Accessed via the Internet. Accessed Dec. 22, 2016. <URL: http://wowwiki.wikia.com/wiki/Character_info>.
Japanese Office Action dated Jan. 26, 2021 in Japanese Patent Application No. 2019-224314 (with English translation), 5 pages.

* cited by examiner

SERVER DEVICE, METHOD FOR CONTROLLING THE SAME, AND COMPUTER-READABLE RECORDING MEDIUM

CROSS-REFERENCE TO RELATED APPLICATION

This application is a continuation of U.S. application Ser. No. 14/316,656, filed Jun. 26, 2014 (the entire content of which is incorporated herein by reference), which claims priority of Japanese Patent Application No. 2013-136890, filed Jun. 28, 2013 and Japanese Patent Application No. 2013-232978, filed Nov. 11, 2013.

BACKGROUND

Disclosed herein are a server device, a method for controlling the same, and a computer-readable recording medium.

Recently games that are provided from a server device via a communication network to mobile terminals that players are operating have become a hit, and a lot of game titles have been released from a plurality of platforms. There are a wide variety of types and categories of these games, among which social games allowing a plurality of players to participate in the same game are particularly enjoying a boom. Such a social game can be said to use a community-forming network service called a social networking service (SNS).

A known social game utilizing the features of a SNS is configured to, for example, let characters (player characters) manipulated by a plurality of players attack one or a plurality of enemy characters to develop a fighting event such as a battle (combat). In this case, each player can be a member of a specific group such as a guild, a party, a team or a community, which will be described later to beat an enemy character, whereby various rewards such as a point or an item that can be used in the game can be given not only to the individual players but also to groups to which the players belong.

Such a fighting event to beat an enemy character by a plurality of player characters is conventionally called a "raid battle" in the field of social games. Alternatively, this may be called a "GvR" where a group or a guild is represented with its first letter (G) and an enemy character in a raid battle as a raid character is represented with its first letter (R) (v denotes versus, the same applies in the following).

Another social game that is widely known offers an individual fighting event that is a one for one fighting of player characters and a group fighting event that is a battle between groups (including not only battles but also competitions such as a team sport). As one example of the latter, JP2013-66524A describes an online game to develop a group fighting (battle) between a plurality of parties. In this game, when matching of a plurality of parties, to which player characters belong, is established in a coliseum hall as a predetermined virtual space in the game, such a group fighting (battle) between the parties is performed. Such a direct fighting between groups is conventionally called a "guild battle" in the field of social games, or may be called "GvG" represented with the first letters (G) of the group or the guild as stated above.

SUMMARY

In the above-stated social game, a new group is created as follows. A player, who creates a new group, calls for the participation (belonging) of other players. After a certain number of players participate in the group, such a group is allowed to act in the social game, such as participation in a fighting event.

In this way, when a new group is created, such a group is not allowed to act as a group until the certain number of players participates in the group. That is, the player who created the group and other players who decided to participate in the group cannot play a game until the number of players in the group reaches the certain number. When such a loss in time is generated, a player will be reluctant to create a new group because they cannot progress a game during the lost time, and so it is difficult for a player to enjoy the game in a new group created with players different from before and so the game cannot exert its attractiveness and amusement sufficiently.

In view of such a circumstance, embodiments of the invention provide a server device, a method for controlling the same, and a computer-readable recording medium, which are capable of, when a new group is created, allowing such a group to progress a game smoothly.

In order to solve the aforementioned problems, a computer-readable recording medium disclosed herein can be readable by a computer that provides a game, in which a plurality of players can participate, that is connected to terminal devices operated by the players via a communication line, and that can access an information storage unit that stores, as a part of information on the game, information on a first group, in which the players participate, and information on a second group, in which the players are supposed to participate. The recording medium having stored thereon a computer program to let the computer execute accessing the information to execute an arithmetic operation relating to the game and to display an image of the game at the terminal devices; and operating a control unit to receive a notification on acceptance of participation in the second group from the terminal devices, and when it is determined that the number of players supposed to participate in the second group reaches a certain number based on the notification, to store the second group as a new first group at the information storage unit.

A method for controlling a server device disclosed herein is to control a server device that provides a game, in which a plurality of players can participate, and that is connected to terminal devices operated by the players via a communication line, the server device comprising: an information storage unit that stores information on the game; and a control unit that accesses the information to execute an arithmetic operation relating to the game and to display an image of the game at the terminal devices. The method comprises: operating the information storage unit to store, as a part of the information on the game, information on a first group, in which the players participate, and information on a second group, in which the players are supposed to participate; and operating the control unit to receive a notification on acceptance of participation in the second group from the terminal devices, and when it is determined that the number of players supposed to participate in the second group reaches a certain number based on the notification, store the second group as a new first group at the information storage unit.

A server device disclosed herein provides a game, in which a plurality of players can participate, and is connected to terminal devices operated by the players via a communication line. The server device comprises: an information storage unit that stores information on the game; and a control unit that accesses the information to execute an arithmetic operation relating to the game and to display an image of the game at the terminal devices. The information storage unit stores, as a part of the information on the game, information on a first group, in which the players participate, and information on a second group, in which the players are supposed to participate; and the control unit receives a notification on acceptance of participation in the second group from the terminal devices, and when it is determined that the number of players supposed to participate in the second group reaches a certain number based on the notification, stores the second group as a new first group at the information storage unit.

A game system disclosed herein comprises a server device that provides a game, in which a plurality of players can participate, and that is connected to terminal devices operated by the players via a communication line; and the terminal devices. The game system comprises: an information storage unit that stores information on the game; and a control unit that accesses the information to execute an arithmetic operation relating to the game and to display an image of the game at the terminal devices. The information storage unit stores, as a part of the information on the game, information on a first group, in which the players participate, and information on a second group, in which the players are supposed to participate; and the control unit receives a notification on acceptance of participation in the second group from the terminal devices, and when it is determined that the number of players supposed to participate in the second group reaches a certain number based on the notification, stores the second group as a new first group at the information storage unit.

A server device disclosed herein provides a game, in which a plurality of players can participate, and is connected to terminal devices operated by the players via a communication line. The server device comprises:

information storage means that stores information on a game, and control means that accesses the information to execute an arithmetic operation relating to the game and to display an image of the game at terminal devices. The information storage means stores, as a part of the information on the game, information on a first group, in which players participate, and information on a second group, in which players are supposed to participate. The control means unit receives a notification on acceptance of participation in the second group from the terminal devices, and when it is determined that the number of players supposed to participate in the second group reaches a certain number based on the notification, the control means stores the second group as a new first group at the information storage unit.

A method for controlling a terminal device is disclosed herein, the terminal device included in a game system comprising a server device that provides a game, in which a plurality of players can participate, and that is connected to terminal devices operated by the players via a communication line; and the terminal devices. The method comprises: letting a player who participates in a first group receive a notification on invitation to participate in a second group that is different from the first group; and transmitting a notification on acceptance of participation in the second group to the server device.

Herein, the "player" refers to a user who operates a terminal device, which is a concept corresponding to a client of a client-server system as well, and from the viewpoint of distinguishing it from a user of a server device (a server administrator or the like), this is referred to as a "player". A player typically can participate in a game through a character that acts, behaves, thinks and the like in a virtual game space or an appropriate game medium that is associated with the character (hereinafter this is called a "player character" in combination) instead of the player himself/herself. A "player" as disclosed herein mainly represents a player character strictly, and this may be described simply as a "player" in the following.

A "group" may include a variously-elaborated virtual group having a plurality of members, such as a "guild", a "party", a "team" or a "community", which is a general designation. Such a "group" may be created or formed for each game title, or may be created or formed for each platform, for example, as a common group or a shared group across a plurality of game titles. The disclosure describes a "fighting event" as a major event between groups, and an event between groups may include a different type of event such as an exchange event between groups that is executed as a part of a social game in addition to such a fighting (battle) type event.

A server device, a method for controlling the same, and a computer-readable recording medium disclosed herein are capable of, when a new group is created, allowing such a group to progress a game smoothly.

DETAILED DESCRIPTION

Figure 1:
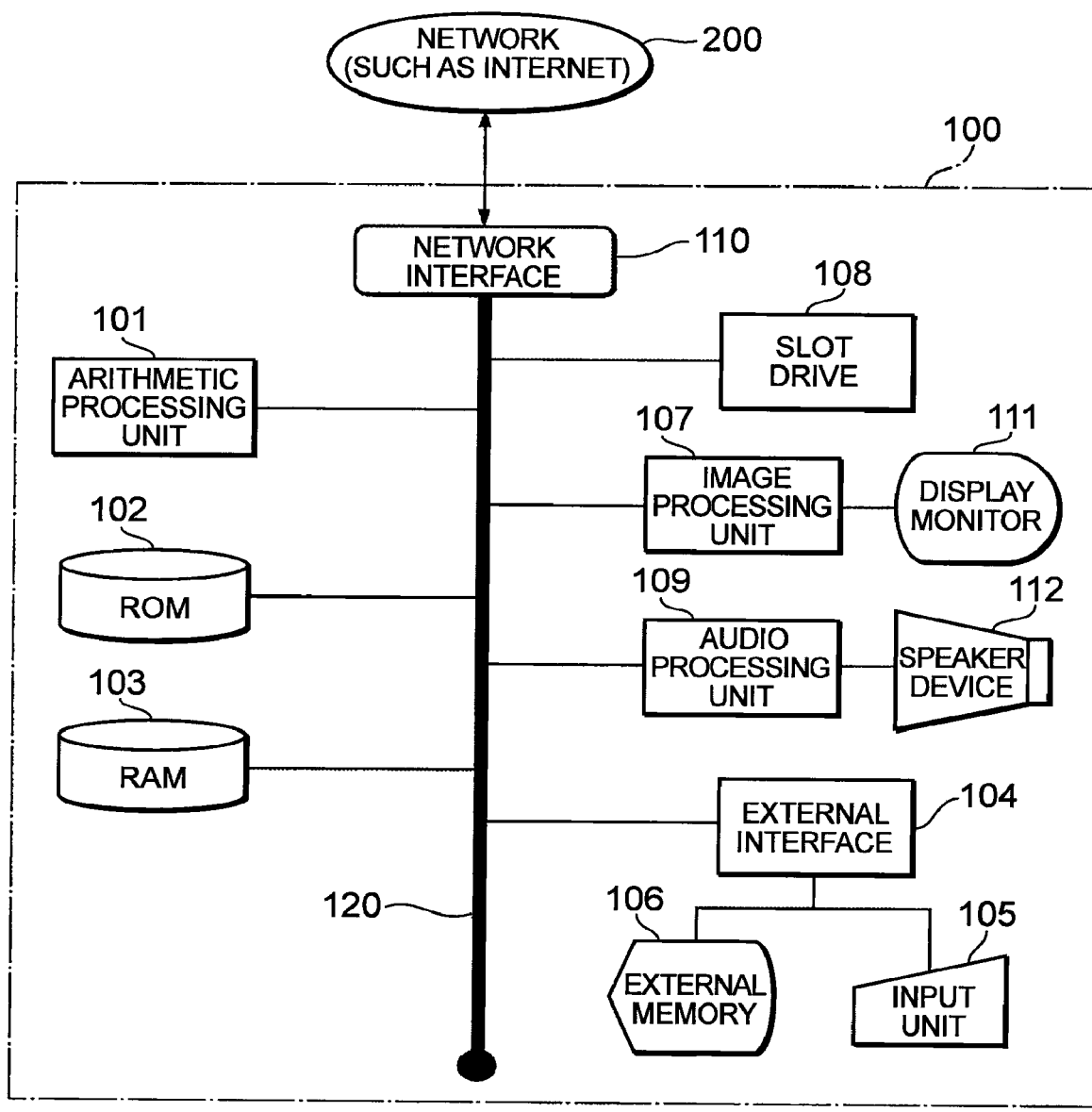
FIG. 1 schematically illustrates (system block diagram) the structure of a server device that is a preferred embodiment of the invention.

The following describes embodiments of the invention in detail. The following embodiments illustrate the invention for description, and are not intended to limit the invention to the embodiments only. The invention can be modified variously as long as its gist is not changed. A person skilled in the art can use embodiments that are obtained by replacing the following elements with their equivalents, and such embodiments also are included in the scope of the invention. The positional relationship such as vertical and horizontal described as needed is based on the illustration of the drawings unless otherwise designated. The ratios of the dimensions in the drawings are not limited to the illustrated one. The following exemplifies an embodiment of the invention by way of an information processing device for games for easy understanding, and the invention disclosed herein is not limited to this as stated above.

Figure 2:
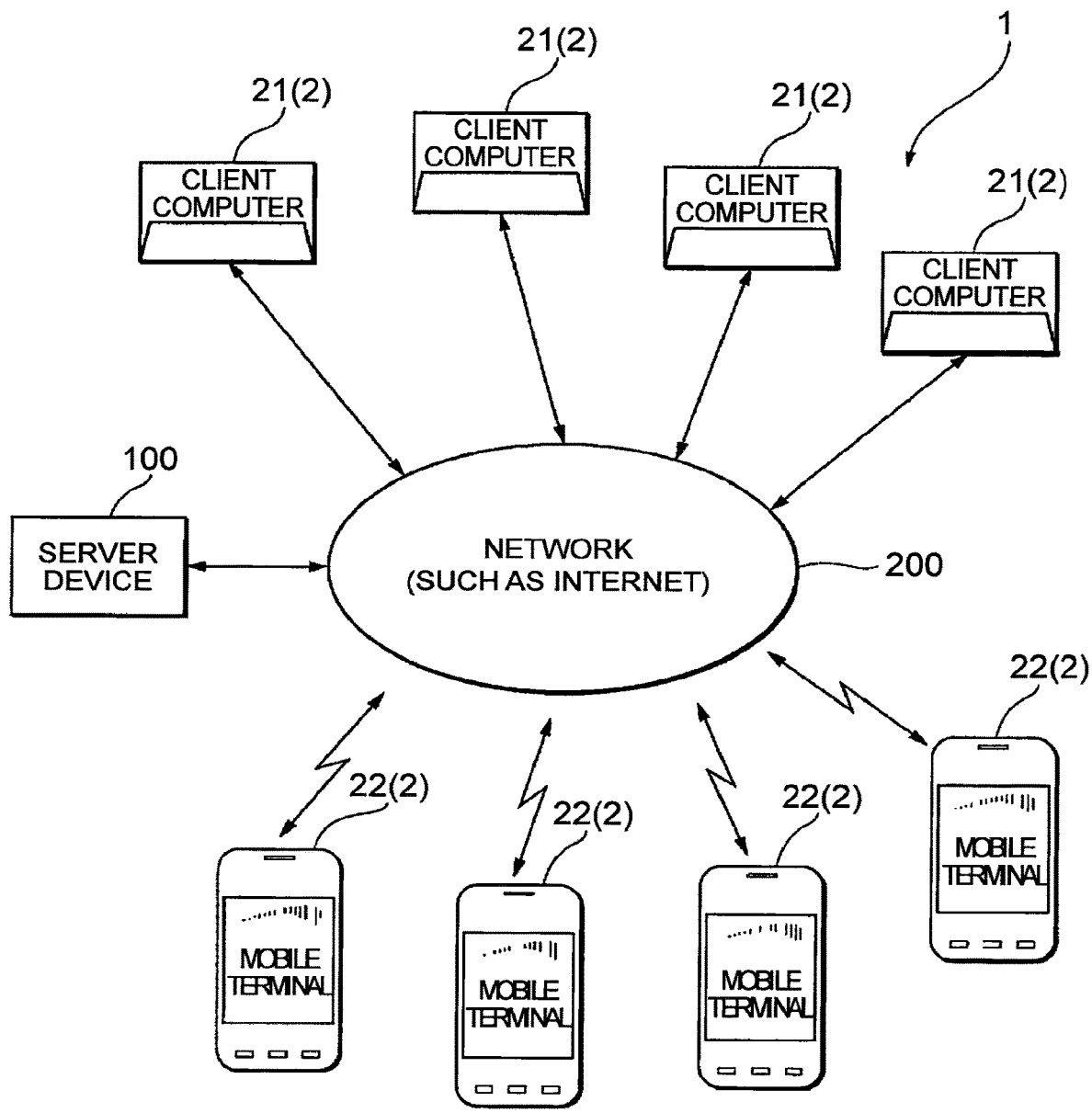
FIG. 2 schematically illustrates (system configuration diagram) the structure of a game system of the preferred embodiment.

FIG. 1 schematically illustrates (system block diagram) the structure of a server device that is a preferred embodiment of the invention. FIG. 2 schematically illustrates (system configuration diagram) the structure of a game system that is a preferred embodiment of the invention. As illustrated in these drawings, a server device 100 is a server computer that is connected to a network 200, and implements a server function through the operation of a predetermined server program in the server computer. The server device 100 and terminal devices 2 such as client computers 21 and mobile terminals 22 similarly connected to the network 200 in a wired or wireless manner are configured mutually-communicably, whereby a game system 1 is configured.

The network 200 is a communication line or a communication network relating to information processing, including the Internet, for example. The specific configuration thereof is not limited especially as long as it is configured so as to enable exchange of data between the server device 100 and the terminal devices 2. For instance, the network 200 may comprise a base station that is wirelessly connected to a terminal device 2, a mobile communication network connected to the base station, the Internet connected to the server device, and a gateway device that connects the mobile communication network and the Internet.

The server device 100 comprises an arithmetic processing unit 101 such as a CPU or a MPU, a ROM 102 and a RAM 103 as storage devices, an external interface 104 connected to an input unit 105 and an external memory 106, an image processing unit 107 connected to a display monitor 111, a slot drive 108 containing or connected to a disk, a memory device or the like, an audio processing unit 109 connected to a speaker device 112, and a network interface 110, which are mutually connected via a transmission line 120 such as a system bas including an internal bas, an external bas, and an expansion bus. Devices for inputting/outputting such as the input unit 105, the external memory 106, the display monitor 111 and the speaker device 112 may be omitted as needed, and even when they are included, they may not be always connected to the transmission line 120.

The arithmetic processing unit 101 controls the overall operation of the server device 100, transmits/receives control signals and information signals (data) among the above-stated elements, and performs various types of arithmetic processing that is necessary for execution of a game. To this end, the arithmetic processing unit 101 is configured to be capable of performing, to a fast accessible storage area such as a register, arithmetic operations such as addition, subtraction, multiplication and division, logical operations such as logical OR, logical AND and logical NOT, and bit operations such as bitwise OR, bitwise AND, bit inversion, bit shift and bit rotation using an arithmetic logical unit as well as saturation calculation, trigonometric function calculation, vector calculation and the like as needed.

The ROM 102 contains an Initial Program Loader (IPL) recorded therein that is typically executed firstly after power activation. Following the execution of this IPL, a server program and a game program recorded in the disk or the memory device contained in or connected to the slot drive 108 is once read by the arithmetic processing unit 101 in the RAM 103, and such a program is executed by the arithmetic processing unit 101. The ROM 102 further contains a program of the operating system that is necessary for the overall operation control of the server device 100 and other various types of data recorded therein.

The RAM 103 is to temporarily store a server program, a game program, and various types of data. The RAM 103 holds the server program and the game program that are read as stated above and data necessary to advance a game or to establish a communication among a plurality of terminal devices 2, for example. The arithmetic processing unit 101 sets the range of variables for the RAM 103 and directly performs arithmetic operations using an arithmetic logical unit to values stored at the range of variables. The arithmetic processing unit 101 may copy or move the values stored in the RAM 103 to a register once for storage, directly perform arithmetic operations to the register and then write the result of the operation back to the RAM 103.

The input unit 105 connected via the external interface 104 receives various operations for inputting that a user (provider of a game) of the server device 100 performs. The input unit 105 may include a keyboard, a touch pad or a touch panel as well as an audio input device, for example, and the types of the device are not limited especially as long as it enables various operations for inputting, decision operations, cancel operations, input of instructions such as menu display and the like.

The RAM 103 and the external memory 106 that is connected detachably via the external interface 104 store data indicating operation states of the server device 100, access states of the terminal devices 2, and play states and progressing states (historical record and the like) of a game at each terminal device 2, a log (record) of communications among the terminal devices 2 and the like, which are stored in a rewritable manner.

The image processing unit 107 records various types of data in a frame memory or the like that are read from the slot drive 108 and are subjected to processing by the arithmetic processing unit 101 or the image processing unit 107 itself to be image information. Such image information recorded in the frame memory is converted into a video signal at a predetermined synchronizing timing, and is output to the display monitor 111 connected to the image processing unit 107. This enables display of various types of images. Image information relating to a game is sent out from the image processing unit 107 and/or the arithmetic processing unit 101 to each terminal device 2 by the cooperative processing with the arithmetic processing unit 101 and the like.

The audio processing unit 109 converts various types of data read from the slot drive 108 into audio signals, and outputs it from the speaker device 112 connected to the audio processing unit 109. Audio information (sound effects and song information) relating to a game is sent out from the audio processing unit 109 and/or the arithmetic processing unit 101 to each terminal device 2 by the cooperative processing with the arithmetic processing unit 101 and the like.

The network interface 110 is to connect the server device 100 to the network 200. The network interface 110 includes an interface complying with various standards used for the configuration of a LAN, modems such as an analog modem, an ISDN modem, an ADSL modem and a cable modem for connection to the Internet or the like using a cable television line, and the interface for connection of them to the arithmetic processing unit 101 via the transmission line 120.

Figure 3:
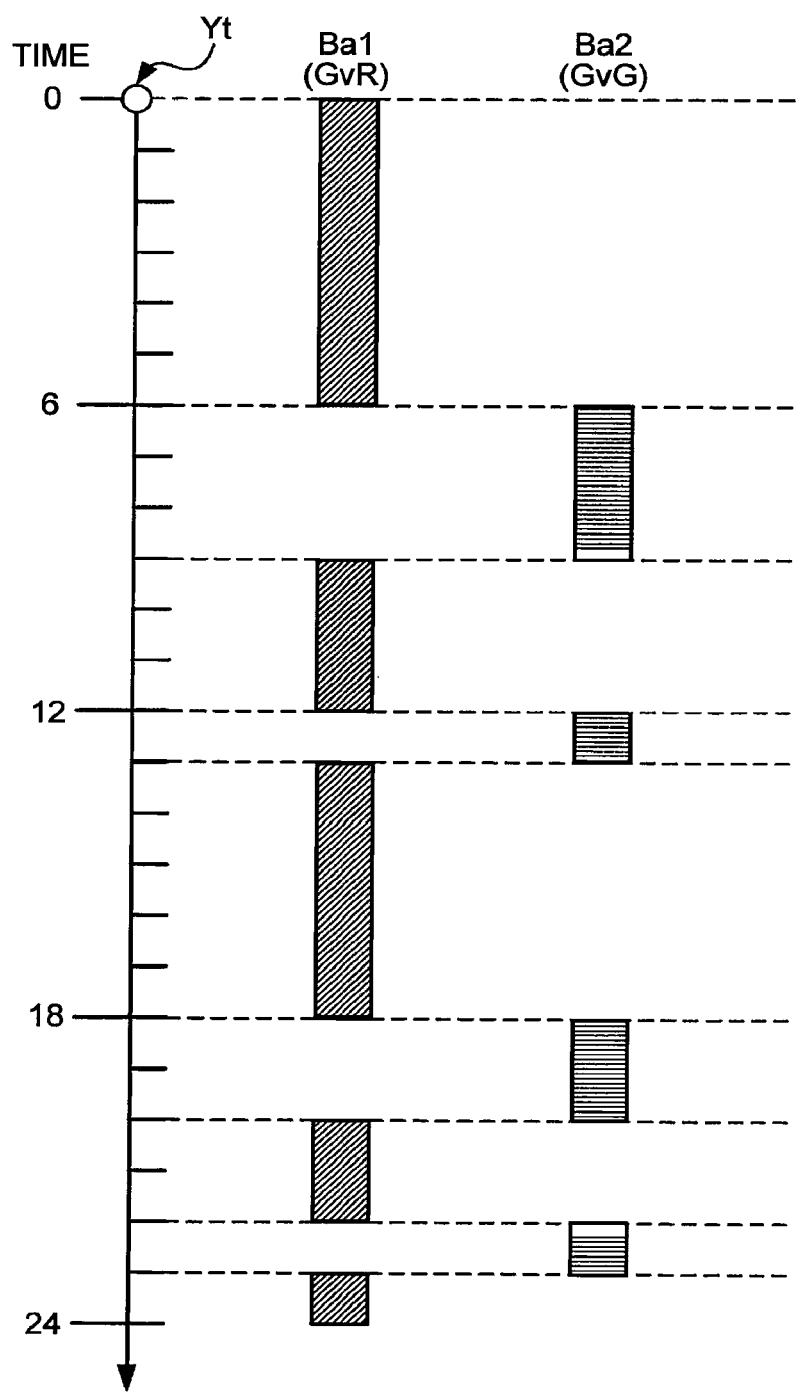
FIG. 3 is a conceptual diagram illustrating one exemplary time table of a game that is executed in the server device of FIGS. 1 and 2.
Figure 4:
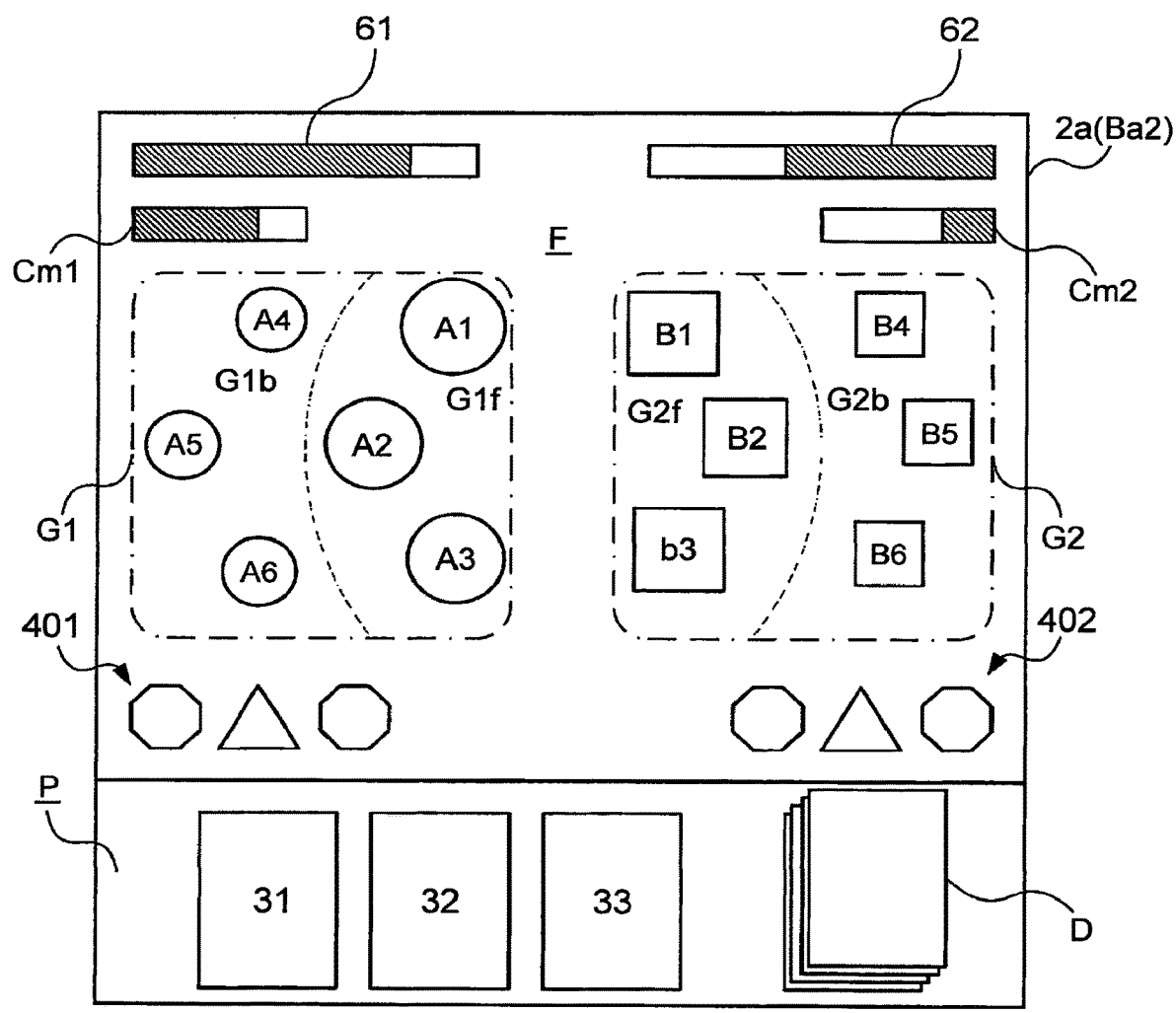
FIG. 4 schematically illustrates an exemplary configuration of a game screen in the game of FIG. 3.

The following describes a game (social game) that is executed in accordance with a game program disclosed herein in the thus configured game system 1 and server device 100. FIG. 3 is a conceptual diagram illustrating one exemplary time table of a game that is executed in the server device 100. FIG. 4 schematically illustrates an exemplary configuration of a game screen in the social game of FIG. 3.

Various types of processing (display of images and screens, determinations, arithmetic operations and the like) in the following procedure are executed in accordance with a control instruction by the arithmetic processing unit 101 of the server device 100. That is, the arithmetic processing unit 101 functions as a "control unit" of the invention. The aforementioned ROM 102, RAM 103 and external memory 106 as well as various storage media recording information on the game therein correspond to an "information storage unit" of the invention.

This game includes mutually different fighting events Ba1 and Ba2, and in the present embodiment, these fighting events Ba1 and Ba2 are continuously performed without interruption from 0 a.m. to 24 p.m. as shown in the temporal axis Yt in FIG. 3. The server device 100 is in a state capable of delivering these fighting events Ba1 and Ba2 to a terminal device 2 of a player in accordance with predetermined schedule and time-series algorithm.

The player operates a terminal device 2 (e.g., a client computer 21 or a mobile terminal 22; tablet terminal, smartphone or the like) to connect the terminal device 2 to the server device 100 via the network 200 such as the Internet. Then, the player operates the terminal device 2 to select this game provided from the server device 100, or inputs login information such as an ID number or a password at a platform screen shown prior to the selection of the game. When the arithmetic processing unit 101 of the server device 100 recognizes the login information, the terminal device 2 displays a my-page screen or a my-home screen specific to the player that is associated with the ID number. In some types of games, the my-page screen displays a banner including the list of a plurality of scenes (e.g., location, dungeon, quest and the like) that is set as a game scene. The scenes such as the location, the dungeon and the quest may be or may not be in the form of hierarchy mutually or as individual structures.

In the case of this game, the arithmetic processing unit 101 of the server device 100 displays, on the my-page screen or the my-home screen, a menu screen relating to the aforementioned "guild" that is a group to which individual players belong. A player who played the game before or have experience of participating in the game basically belongs to one predetermined guild, and information thereon is stored at an information storage unit such as the ROM 102 while being associated with specific information such as the ID information of the player. Based on the information, the arithmetic processing unit 101 then displays information on the guild to which the player belongs and an edit menu or the like relating to the guild as needed on the terminal device 2.

On the other hand, when a player plays the game for the first time or participates in the game for the first time, the player basically does not belong to a specific guild. Then, the arithmetic processing unit 101 displays a menu screen on the terminal device 2 of the player who does not belong to a guild to let the player search for (retrieve) a guild or create (establish) a new guild. The player operates the terminal device 2 in accordance with an instruction in a pull-down menu or the like that is successively displayed from the menu screen and so can decide or create a guild to participate in.

After deciding or selecting a guild to which the player belongs, a list of a plurality of games and events is displayed on the terminal device 2 as needed. When the player selects to participate in the game, the screen of a game event that is being performed at that time is displayed on the terminal device 2 of the player. This allows the player to freely participate in the game event that is being held at that time. At this time, the terminal device 2 of the player may display a preparation screen or an introduction screen of various types of game events, which may be a still image or a moving image (flash, for example).

As stated above, in one example shown in FIG. 3, the server device 100 always executes any one of the fighting events Ba1 and Ba2. For instance, in the case where the login time to the game is any one of from 0 a.m. to 6 a.m., from 9 a.m. to 12 a.m., from 1 p.m. to 6 p.m., from 8 p.m. to 10 p.m. and from 11 p.m. to 12 p.m. (0 a.m. in the next date), fighting event Ba1 is held in this game community. Similarly, in the case where the login time to the game is any one of from 6 a.m. to 9 a.m., from 12 a.m. to 1 p.m., from 6 p.m. to 8 p.m., and from 10 p.m. to 11 p.m., fighting event Ba2 is held in this game community. In this way, the arithmetic processing unit 101 is configured to execute the processing of the fighting event Ba1 or Ba2 to be held in accordance with the predetermined schedule.

Between these fighting events Ba1 and Ba2, the fighting event Ba1 is a raid battle, i.e., a battle between guild G1 (group) to which the player belongs and a raid as an enemy player character (corresponding to the aforementioned GvR). On the other hand, the fighting event Ba2 is a guild battle, i.e., a battle between guilds G1 and G2 (both are groups) to which players belong (corresponding to the aforementioned GvG).

Referring to FIG. 4, one example of the fighting event Ba2 (GvG; guild battle) at the starting of the execution that is displayed on the terminal device 2 of each player is described below. The processing procedure of this fighting battle Ba2 (this may be called a quest, a turn or the like depending on game titles: the same applies to the fighting event Ba1) begins with defining an event field F and a pallet P as display areas of the game image on a screen 2a of the terminal device 2 and displaying elements thereof at these display areas.

Specifically player characters A1 to A6 belonging to guild G1 (first group) and player characters B1 to B6 belonging to guild G2 (first group) are displayed as a part of the elements at the event field F. That is, in this case, an area where player characters A1 to A6 of guild G1 are displayed (main field of guild G1) and an area where player characters B1 to B6 of guild G2 are displayed (main field of guild G2) are mainly defined at the event field F. Player characters A1 to A6 belonging to guild G1 and player characters B1 to B6 belonging to guild G2 each join together to fight a direct battle with opponent player characters of the opponent guilds.

The game is configured so that, for both of the above guilds G1 and G2, the player characters as forward players only receive a damage by an attack from the opponent player characters, and both of the forward and back player characters can participate in attacks.

In the form of the fighting at this fighting event Ba2, the screen 2a of each terminal device 2 of player characters A1 to A6 in guild G1 shows pallet P. This pallet P is a place where each player character A1 to A6 and B1 to B6 in guilds G1 and G2 decides their "weapons" (normal weapons and special weapons) by random drawing that can be used for attacking of opponent player characters B1 to B6 and A1 to A6 as their elements. This pallet P displays a deck D that is a virtual bundle of cards and a plurality of cards (game media) selected from the deck D.

Each card includes a type of the "weapon" or a player character representing it, and a specific item, illustration and letters relating to the weapon that are drawn or described thereon. Each card contains information set therefor, including the weapon, the attack rate (a point of the weapon or activated action; action point (AP) or weapon point (weapon P)), the defense rate (this may be health or hit point (HP)), attributes (e.g., colors such as red, green and blue and forms such as fire, water, trees and light), the degree of rareness (rarity) and the like. When the player turns over the cards one by one from the deck D and if three cards 31, 32 and 33 displayed have only one type, attribute or the degree of rareness or have a specific combination (pat), the effect such as increasing the attack power and the defense power of player A1 to A6 will be activated. Then, the weapon that is to be activated by the selection or the combination of cards 31, 32 and 33 or their related items being executed 401 and 402 are displayed below the player characters A1 to A6 and B1 to B6, respectively, at the event field F.

In the state where the three cards 31, 32 and 33 are displayed at the pallet P, when the player further turns over a card from the deck D, then any one of the cards 31, 32 and 33 (e.g., the card 31 on the left in the drawing) will be removed from the screen 2a, and the newly selected card will be displayed. At this time, the display may be adapted so that the card 31 to be deleted is slid out to the outside of the pallet P, for example, the remaining cards 32 and 33 are slid to the left, and the new card is slid into the empty space.

When each player character A1 to A6 in guild G1 selects (turns over) cards one by one from the deck D at the pallet P, a damage done to the opponent and a damage that the player receives can be calculated in accordance with the combination of the weapons, attack rates, specific items and defense rates as well as their attributes, degrees of rareness and the like set for the cards 31, 32 and 33 when the player attacks player characters B1 to B6 of the opponent guild G2. On the other hand, a similar display is shown on the screen 2a of each terminal device 2 of player characters B1 to B6 of guild G2 as well, and they attack player characters A1 to A6 of the opponent guild G1.

HP gauges 61 and 62 for guilds G1 and G2 are displayed above the main field of guilds G1 and G2, respectively. Then the number of times player character A1 to A6, B1 to B6 attacks their opponent player characters continuously (the number of combos) before receiving an attack from the opponent player characters B1 to B6, A1 to A6 is displayed as combo gauges Cm1 and Cm2 in the vicinity of the HP gauges 61 and 62, respectively. When the number of combos displayed in these combo gauges Cm1 and Cm2 reaches a predetermined value or more, the power of a weapon used against the opponent player characters B1 to B6, A1 to A6 by player character A1 to A6, B1 to B6 is enhanced, whereby a damage to be done to the opponent player characters increases. Then, the winner or the loser will be determined based on the values of the HP gauges 61 and 62 at the ending time of the fighting.

As stated above, a player belongs to guild G1 or G2, for example, to execute fighting event Ba1 or Ba2. The following describes the case where such a player creates a new guild. The player creates a new guild and then other player characters take part in the guild, whereby the player can newly play fighting events Ba1, Ba2 and the like with the other player characters (i.e., different members of a guild). Referring to FIG. 5 and FIGS. 7 to 10, the following describes the processing of the present embodiment to let a predetermined player create (launch) a new guild.

Figure 5:
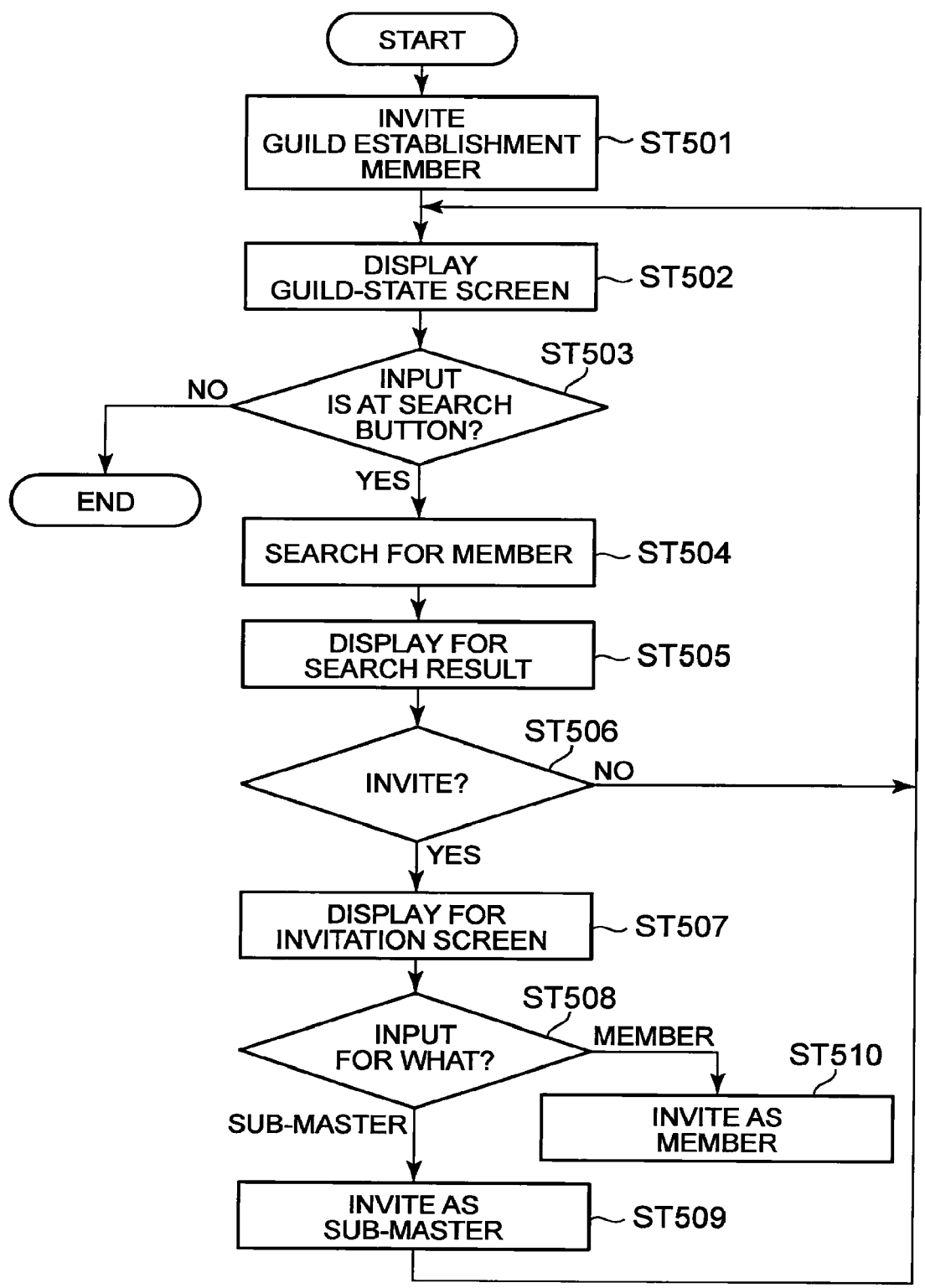
FIG. 5 is a flowchart illustrating one example of the processing to invite members to establish a guild.

FIG. 5 is a flowchart illustrating one example of the processing to let a predetermined player leave the currently belonging guild and create a new guild G3 "Alliance (or alliance of Blood-pledge in English)" (second group), and invite members (players) to participate in the guild G3 "Alliance".

Firstly, when the player inputs at a guild establishment member invitation starting button 51 (see FIG. 7) that is displayed on a display screen 2b of the terminal device 2, for example, the arithmetic processing unit 101 starts the processing to invite a guild establishment member (ST501).

Figure 8:
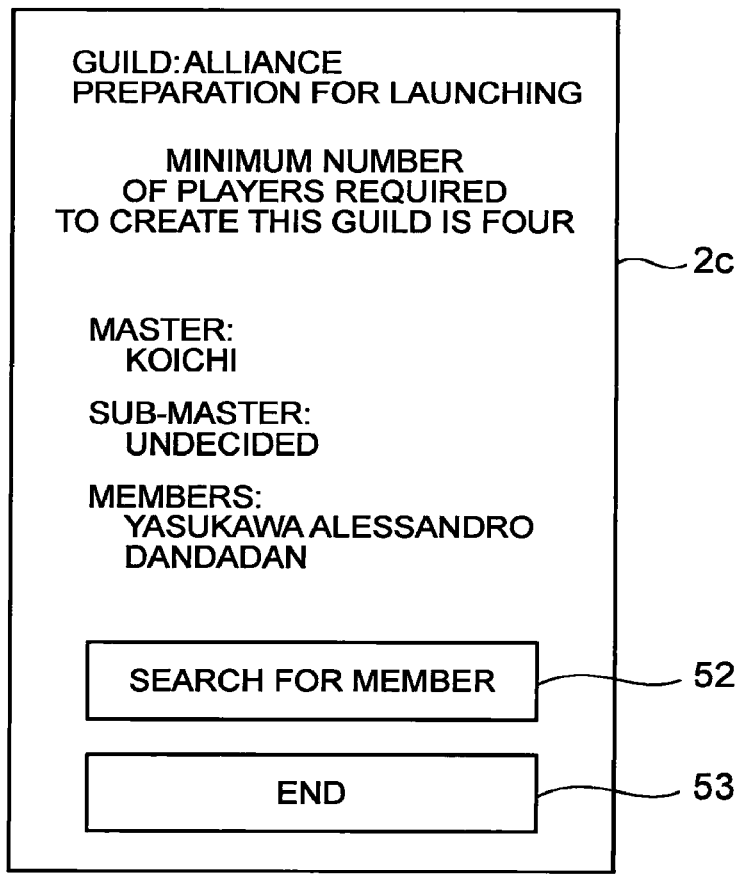
FIG. 8 schematically illustrates an exemplary configuration of a screen for guild-launching processing.

The arithmetic processing unit 101 firstly displays a guild-state screen of a guild that is newly established on the display screen 2b of the terminal device 2 (ST502). A state of a guild comprises the name of the guild that is newly created, the status, the minimum number of players required to create the guild and the members supposed to participate in as well as a search button to start the processing to search for a participating member and an end button to end the processing. FIG. 8 illustrates one example of the display of such a guild state screen 2c. Referring to FIG. 8, the displays shows "Alliance" as the name of the guild, "preparation for launching" as the status, "minimum number of players required to create the guild is four" as the minimum number of players required to create the guild, "master: Koichi", "sub-master: undecided", and "members: Yasukawa Alessandro, Dandadan" as the members supposed to participate in, "search for member" 52 as the search button and the end button 53. In FIG. 8, although the minimum number of players required to create the guild is four, the number of members supposed to participate in is three, and so the status shows "preparation for launching", meaning that the guild cannot be created. In the current stage, "Koichi" belongs to (participates in) guild G4, "Yasukawa Alessandro" belongs to guild G5, and "Dandadan" belongs to guild G6, and they are supposed to belong to (participate in) guild G3. The present embodiment describes the case where the minimum number of players required to create the guild is four, and such a number may be set appropriately depending on the scale, the contents or the like of the game.

Next, the arithmetic processing unit 101 determines whether input is performed or not at the search button 52 (ST503). When it is determined that input is performed not at the search button 52 but at the end button 53 (ST503: NO), the arithmetic processing unit 101 ends the processing to invite a guild establishment member. On the other hand, when it is determined that input is performed at the search button 52 (ST503: YES), the arithmetic processing unit 101 executes member searching processing (ST504). For instance, the arithmetic processing unit 101 searches information on players that is stored in the information storage unit such as the ROM 102 or the RAM 103 for a player character that meets a predetermined condition as a member candidate. The predetermined condition herein comprises the label or the name of a player character, a guild to which the player character belongs and the like, and searching can be performed while designating them.

Figure 9:
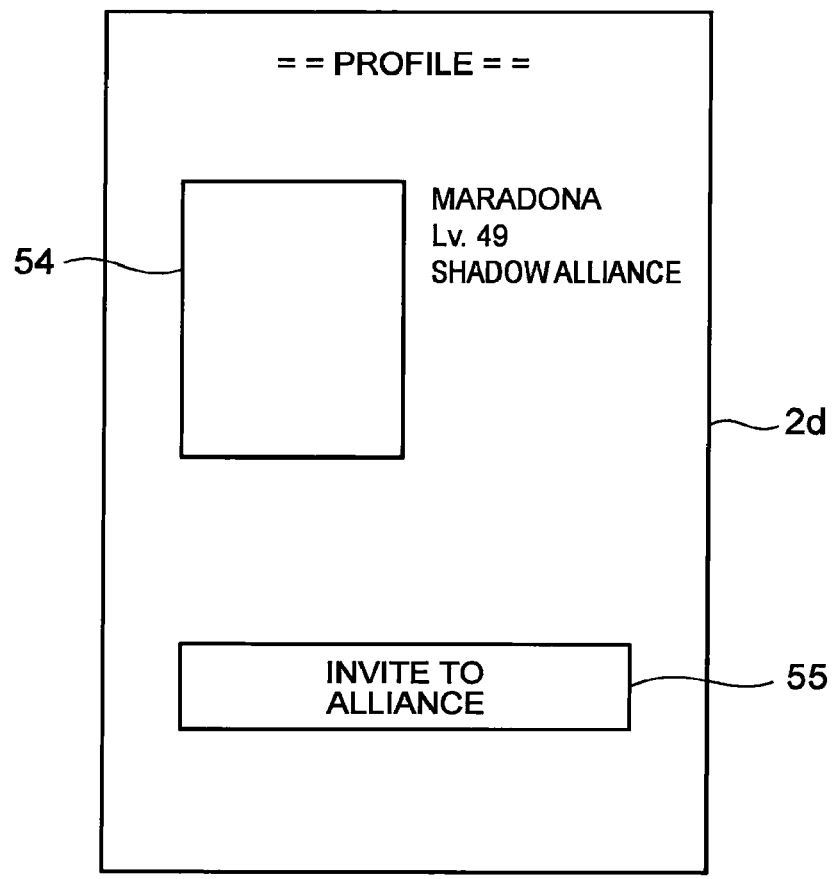
FIG. 9 schematically illustrates an exemplary configuration of a screen for guild-launching processing.

After searching for player characters as member candidates is performed, the arithmetic processing unit 101 displays a result of the searching at the terminal device 2 (ST505). When the result of the searching includes a plurality of members, the player is allowed to view the profile of the player characters one by one through a predetermined operation. The profile displayed comprises the name of a player character, the level, the name of the guild to which the player currently belongs, and the like. FIG. 9 illustrates one example of the profile display screen 2d of a player character. Referring to FIG. 9, the profile shows "Maradona" as the name of the player character, "Lv.49" as his level, "Shadow alliance" as the name of the belonging guild G7, and an image 54 of the player character. FIG. 9 also displays an invitation button 55, "Invite to Alliance" to let the player issue an instruction to invite the player displayed in the profile as a member.

Next, the arithmetic processing unit 101 determines whether or not to invite a player character that is displayed based on the searching result as a member (ST506). For instance, when it is determined not to invite the player as a member based on the inputting by the player at a return button (not illustrated) (ST506: NO), the procedure returns to the processing of Step S502, where the arithmetic processing unit 101 displays a guild-state screen on the display screen of the terminal device 2 (ST502). On the other hand, when it is determined to invite the player character as a member based on the inputting by the player at the invitation button 55 (ST506: YES), the arithmetic processing unit 101 displays an invitation screen at the terminal device 2 (ST507).

Figure 10:
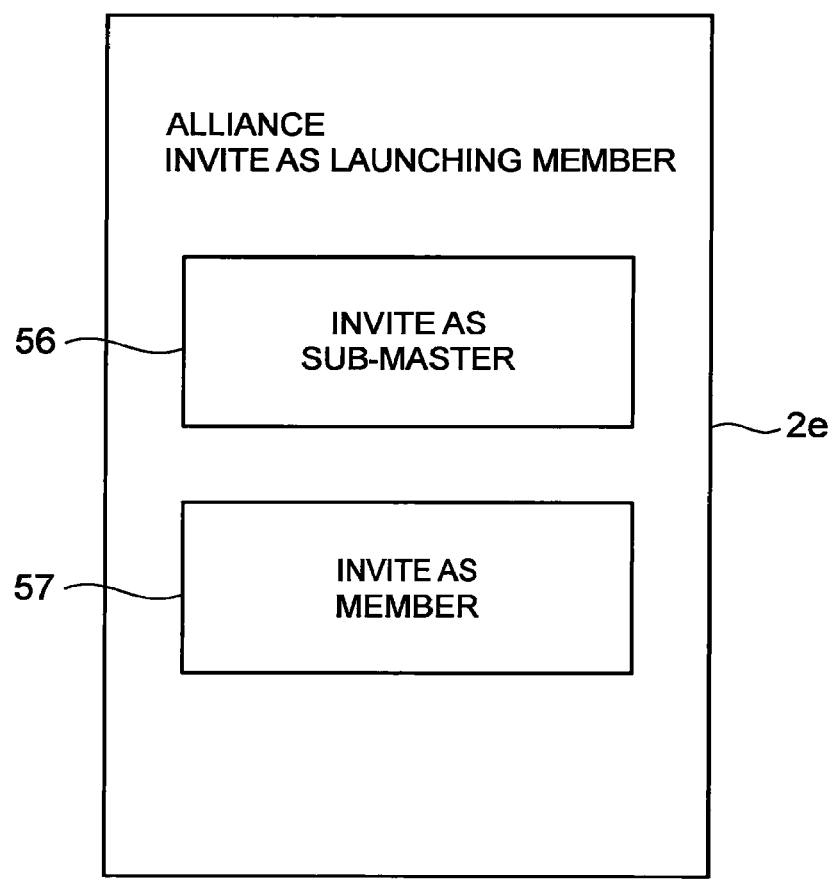
FIG. 10 schematically illustrates an exemplary configuration of a screen for guild-launching processing.

The invitation screen displays a first invitation button to invite a player character searched as a sub-master and a second invitation button to invite the player character as a member. The sub-master refers to a position having the second-highest authority following the master to manage the guild. FIG. 10 illustrates one example of the invitation screen 2e. Referring to FIG. 10, the invitation screen 2e displays "invite as sub-master" 56 as the first invitation button and "invite as member" 57 as the second invitation button.

Next, the arithmetic processing unit 101 determines whether input is to invite the player character as a sub-master or as a member based on the operation of the player (ST508). When the first invitation button 56 is input, the player character is invited as a sub-master (ST509), and when the second invitation button 57 is input, the player character is invited as a member (ST510). Then, the procedure returns to the processing to display the guild state screen 2c at Step S502. Herein, mail including the description to invite to the guild, for example, is transmitted as the invitation to the terminal device 2 of the player who manipulates the player character, and when acceptance to the invitation is transmitted from the terminal device 2 based on the display of the mail, the arithmetic processing unit 101 stores the player character as a player character supposed to participate in the guild G3 "Alliance" at the RAM 103, for example. If the player accepts invitations for participation from a plurality of new guilds, participation in each guild can be accepted. However, since a player character is allowed to participate in only one guild, the arithmetic processing unit 101 sets a guild in which the player is supposed to participate based on the latest notification to accept the participation. This can avoid the player from belonging to a plurality of guilds at a time. A player is allowed to participate in only one guild because fighting events Ba1 and Bat, for example, are configured so that all of the player characters participate in and play the events at the same time.

Figure 6:
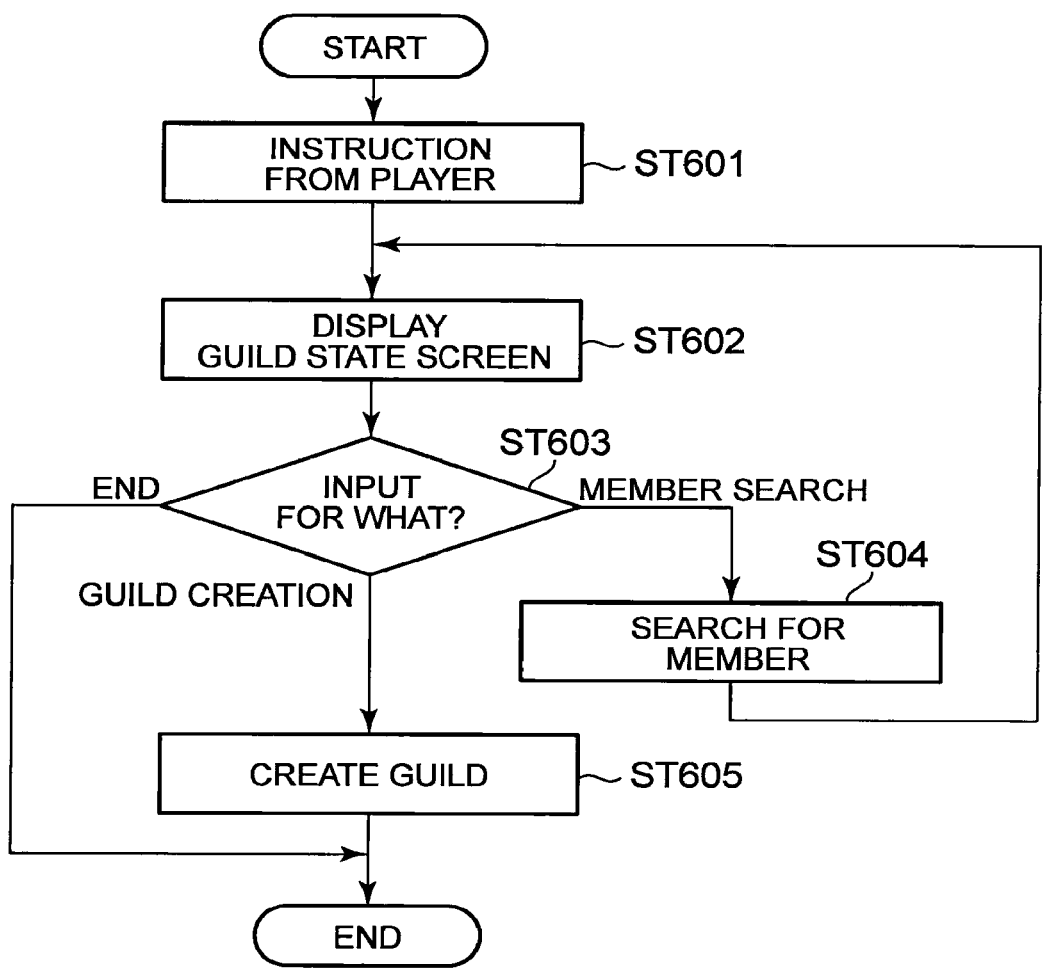
FIG. 6 is a flowchart illustrating one example of the processing to create a guild.
Figure 7:
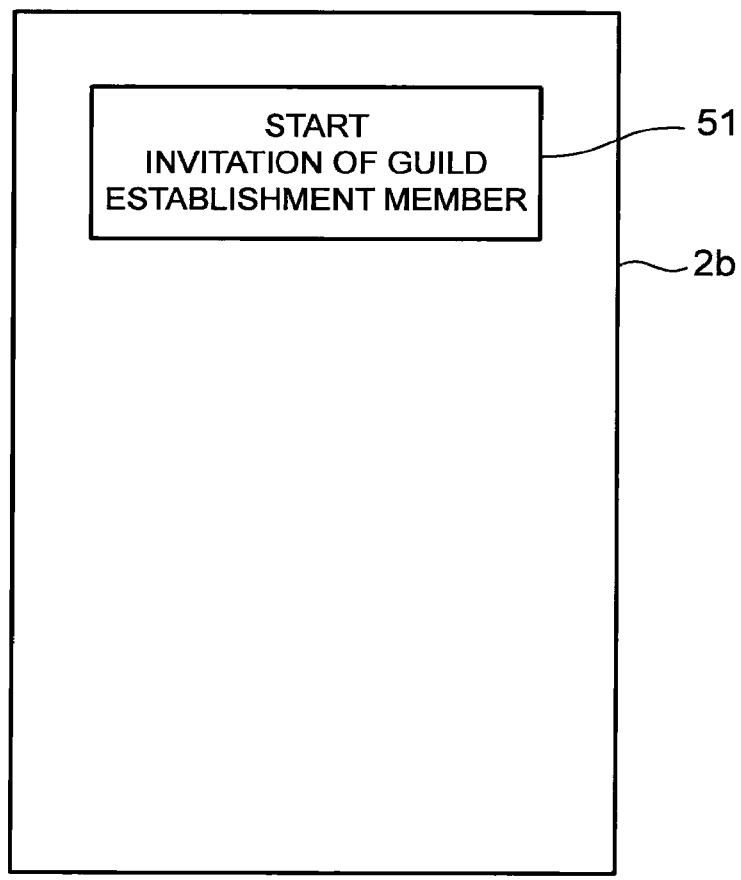
FIG. 7 schematically illustrates an exemplary configuration of a screen for guild-launching processing.
Figure 11:
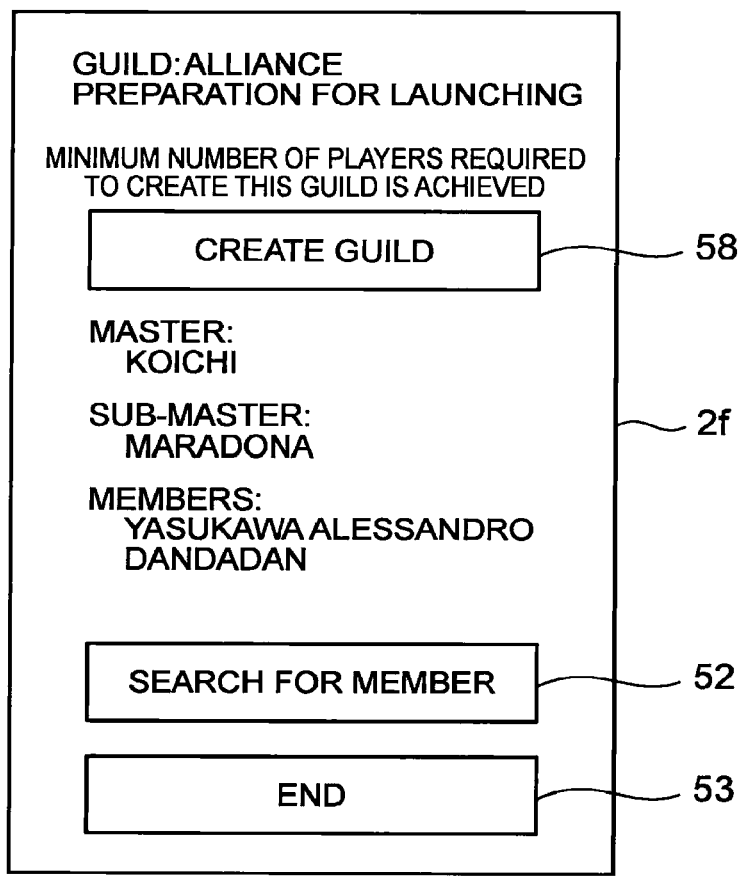
FIG. 11 schematically illustrates an exemplary configuration of a screen for guild-launching processing.
Figure 12:
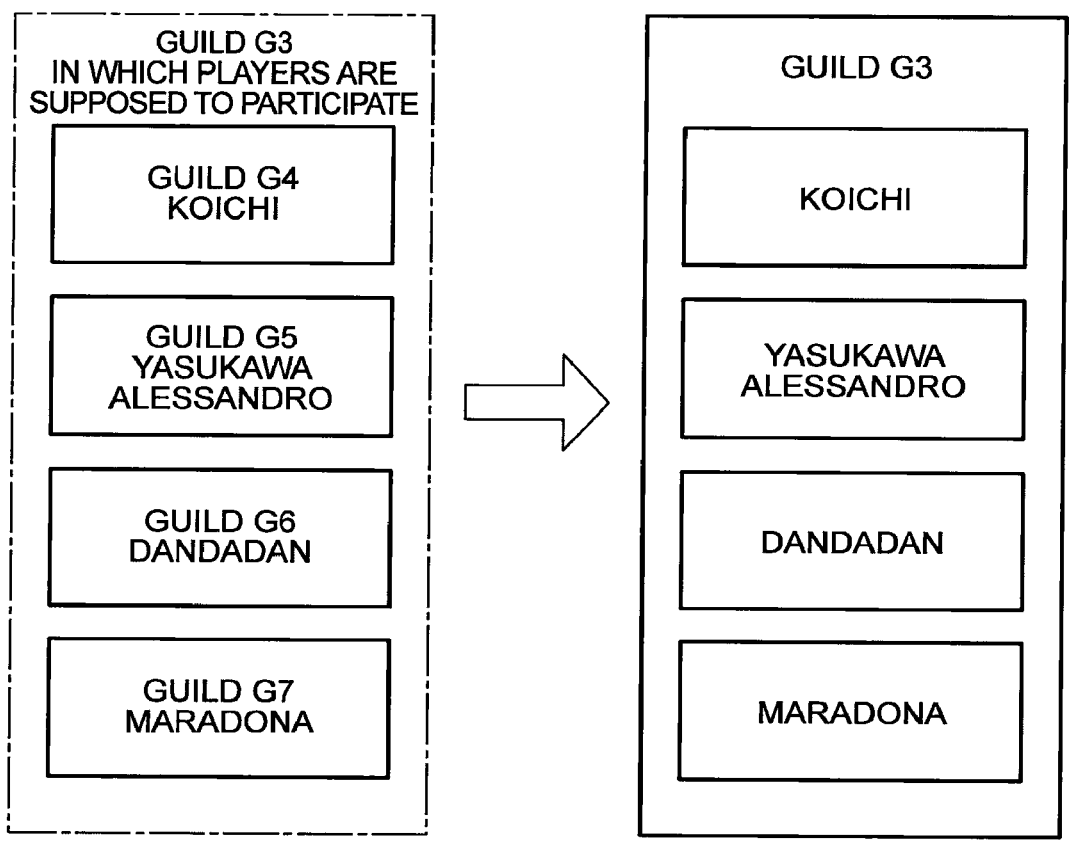
FIG. 12 schematically illustrates an example to change belongings when creating a guild.

Referring next to FIG. 6, FIGS. 11 and 12, the following describes one example of the processing to create a guild. The processing to create a guild is executed after the number of players supposed to participate in the guild reaches the aforementioned minimum number of players required to create the guild and based on an instruction from the player.

The arithmetic processing unit 101 receives a notification to accept the participation in the guild G3 (in the second group) from a terminal device 2, and determines based on the notification that the number of players reaches the minimum number of players required to create the guild. Then, when input is performed at the aforementioned guild establishment member invitation starting button 51 (see FIG. 7) (ST601), the arithmetic processing unit 101 displays a guild state screen at the terminal device 2 (ST602). FIG. 11 illustrates one example of the guild state screen 2f that is to be displayed based on an instruction from the player after the number of members supposed to participate in reaches four because the player character "Maradona", who is described referring to FIG. 9, is added to the guild G3 "Alliance" described referring to FIG. 8. Since the participation of the member "Maradona" who is supposed to participate in as a sub-master means that the number of members exceeds four as the minimum number of players to create the guild and reaches the minimum number of players required to create the guild, this drawing newly displays a guild creating button 58 unlike the guild state screen 2c of FIG. 8.

Next, the arithmetic processing unit 101 determines what is meant by the input from the player (ST603). When it is determined that the input is performed at the member search button 52, then the arithmetic processing unit 101 searches for a member (ST604). Since the processing to search for a member is similar to the aforementioned processing from ST504 to ST510, the detailed descriptions thereon are omitted. When input is performed at the end button 53, this processing ends.

On the other hand, when it is determined that input is performed at the guild creating button 58, the arithmetic processing unit 101 creates the guild G3 "Alliance", in which "Koichi", "Maradona", "Yasukawa Alessandro" and "Dandadan" are supposed to newly participate, and stores the same at the information storage unit such as the RAM 103 as a normal guild. At this time, as illustrated in FIG. 12, the arithmetic processing unit 101 changes the guilds to which the player characters "Koichi", "Yasukawa Alessandro", "Dandadan" and "Maradona" belong from guilds G4, G5, G6 and G7, respectively, to the guild G3 "Alliance" (ST605).

According to the thus configured server device 100, method for controlling the same, game program and game system 1, after the number of player characters supposed to participate in the guild G3 reaches the minimum number of members to create the guild, the guild G3 (second group) being prepared for launching (i.e., supposed to participate in) is stored at the information storage unit such as the RAM 103 as a normal guild (first group) based on an instruction of the player to be the master, and so the players can progress the game as the guild G3 immediately after the creation of the guild. That is, a loss in time is not generated during the newly creation of the guild G3, which may result from the reason that the players supposed to participate in the guild G3 are not allowed to proceed the game until the number of players reaches a certain number, for example, and so they can proceed the game smoothly.

Although the above embodiment describes the case where, after the minimum number of members to create the guild is achieved in the guild G3, the guild G3 is created based on an instruction from the player to be the master, the invention disclosed herein is not limited to this. For instance, when a certain time has elapsed since the minimum number of members to create the guild is achieved, a guild may be created automatically. Since the members of the guild are changed within the certain time in this configuration, this can attract the interest of a player during the time so as to let the player participate in the game.

The above embodiment describes the case where, when the new guild G3 is created, the guilds to which the player characters "Koichi", "Yasukawa Alessandro", "Dandadan", and "Maradona" belong from guilds G4, G5, G6 and G7, respectively, to the guild G3 "Alliance". In another possible case, the player characters may belong to the guild G3 from the beginning instead of changing their belonging guilds. That is, in the case of a player who plays the game for the first time or who participates in the game for the first time, such a player does not belong to any specific guild. When such a player accepts the invitation to participation in the guild G3 and then the guild G3 is created, the player participates in the guild G3 for belonging from the state of not belonging to any guild. In still another possible case, the player, who does not belong to any guild, launches a new guild, and the guild is created. Such a player also participates in the guild for belonging from the state of not belonging to any guild.

As stated above, the invention disclosed herein is not limited to the above embodiments and the already-described modified examples, and may be modified variously as long as its gist is not changed. For instance, the configuration of the server device 100 illustrated in FIG. 1 may be applied to the client computers 21 and the mobile terminals 22 as the terminal devices 2 as well, which are different in ability in processing or the like. In other words, a client computer 21 or a mobile terminal 22 may be used as the server device 100. That is, any computer that is connected via the network 200 may function as the server device 100. Needless to say, instead of implementing all of the functions of the server device 100 illustrated in FIG. 1 with a terminal device 2, an application (hybrid application) may be packaged so as to implement a part of the functions of the server device 100, for example, with a terminal device 2.

The server device 100 may comprise a mass-storage device such as a hard disk or a SSD, which is configured so as to fulfill the functions similar to the ROM 102, the RAM 103, the external memory 106, a memory device loaded in the slot drive 108 and the like. Such a storage device may or may not have a redundant architecture using RAID or the like. This may not be connected to the arithmetic processing unit 101 via the transmission line 120, and may be connected to another external device via the network 200 as a part of cloud computing, for example.

A network interface at the server device 100 and the terminal devices 2 may be a wireless LAN device or a wired LAN device, which may be installed internally or may be of an external device type such as a LAN card. The terminal devices 2 may be a game console that can be connected to the network 200 or may be an online karaoke device, for example.

As described above, the server device, the method for controlling the same, and the computer-readable recording medium of the invention disclosed herein can greatly improve the amusement, the attractiveness and the variety of the fighting event itself, and so can promote activation of a fighting event and accordingly general games, and can develop the feeling of a player to participate in or continue the game. In this way, the invention disclosed herein can be used widely and effectively for general games that are delivered, provided and executed especially in the server-client type network configuration (especially including elements of a social game), general techniques relating to software and hardware for the delivery, provision and execution of the games, and the actions of their designing, manufacturing, sales and the like.

DESCRIPTION OF REFERENCE NUMERALS

1 game system
2 terminal device
2*a* to 2*f* screen
21 client computer (terminal device)
22 mobile terminal (terminal device)
31, 32, 33 card
51 guild establishment member invitation starting button
55 invitation button
58 guild creating button
61, 62 HP gauge
100 server device
101 arithmetic processing unit (control unit)
102 ROM (information storage unit)
103 RAM (information storage unit)
104 external interface
105 input unit
106 external memory
107 image processing unit
108 slot drive
109 audio processing unit
110 network interface
111 display monitor
112 speaker device
120 transmission line
200 network (communication line)
401, 402 items being executed
Ba1 fighting event
Ba2 fighting event
A1 to A6 player characters of guild G1
B1 to B6 player characters of guild G2
Cm1, Cm2 combo gauge
D deck
F event field
G1, G2 guild (group)
P pallet
Yt time axis

What is claimed is:

1. A non-transitory computer-readable recording medium or media storing instructions that are readable by a computer that provides a game in which a plurality of players join a group to play as a team and that is connected to terminal devices operated by the players via a communication line, the instructions, when executed by the computer, cause the computer to:

enable, via a display of a terminal device of a first player, identification of one or more of the players as a candidate player supposed to participate in a second group, in association with information identifying one or more groups in which the one or more of the players currently belongs to;

receive, from at least one of terminal devices of the one or more of the players, a notification on acceptance of participation in the second group;

determine whether a number of players supposed to participate in the second group reaches a predetermined number based on the notification;

update and store the second group as a current group for the players supposed to participate in the second group, when the number of players supposed to participate in the second group reaches the predetermined number; and permit the one or more of the players to continue to participate in the one or more groups to which the one or more of the players currently belong until the number of players supposed to participate in the second group reaches the predetermined number.

2. The non-transitory computer-readable recording medium or media according to claim 1, wherein attribute information of the players supposed to participate in the second group is updated to the second group respectively, from the one or more groups which the players currently belong to, when updating the second group as the current group for the players supposed to participate in the second group.

3. The non-transitory computer-readable recording medium or media according to claim 1, wherein the instructions, when executed by the computer, cause the computer to:
before receiving the notification on acceptance of participation in the second group, send invitations for participation in the second group to terminal devices of the one or more of the players.

4. The non-transitory computer-readable recording medium or media according to claim 3, wherein the instructions, when executed by the computer, cause the computer to:
when a second player receives two or more invitations for participation from two or more players who created second groups respectively, set a latest second group as the current group of the second player, based on the second player's acceptance, the latest second group corresponding to a latest invitation from the two or more invitations.

5. The non-transitory computer-readable recording medium or media according to claim 1, wherein the second group is updated and stored as the current group for the players supposed to participate in the second group, based on an instruction from the first player, after the predetermined number is achieved.

6. The non-transitory computer-readable recording medium or media according to claim 1, wherein the second group is updated and stored as the current group for the players supposed to participate in the second group, when a certain time has elapsed since the predetermined number is achieved.

7. A method for a device that provides a game in which a plurality of players join a group to play as a team and that is connected to terminal devices operated by the players via a communication line, the method comprising:
enabling, via a display of a terminal device of a first player, identification of one or more of the players as a candidate player supposed to participate in a second group, in association with information identifying one or more groups in which the one or more of the players currently belongs to;
receiving, from at least one of terminal devices of the one or more of the players, a notification on acceptance of participation in the second group;
determining whether a number of players supposed to participate in the second group reaches a predetermined number based on the notification;
updating and storing the second group as a current group for the players supposed to participate in the second group, when the number of players supposed to participate in the second group reaches the predetermined number; and
permitting the one or more of the players to continue to participate in the one or more groups to which the one or more of the players currently belong until the number of players supposed to participate in the second group reaches the predetermined number.

8. The method according to claim 7, wherein attribute information of the players supposed to participate in the second group is updated to the second group respectively, from the one or more groups which the players currently belong to, when updating the second group as the current group for the players supposed to participate in the second group.

9. The method according to claim 7, further comprising:
before receiving the notification on acceptance of participation in the second group, sending invitations for participation in the second group to terminal devices of the one or more of the players.

10. The method according to claim 9, further comprising:
when a second player receives two or more invitations for participation from two or more players who created second groups respectively, setting a latest second group as the current group of the second player, based on the second player's acceptance, the latest second group corresponding to a latest invitation from the two or more invitations.

11. The method according to claim 7, wherein the updating and storing updates and stores the second group as the current group for the players supposed to participate in the second group, based on an instruction from the first player, after the predetermined number is achieved.

12. The method according to claim 7, wherein the updating and storing updates and stores the second group as the current group for the players supposed to participate in the second group, when a certain time has elapsed since the predetermined number is achieved.

13. A device that provides a game in which a plurality of players join a group to play as a team and is connected to terminal devices operated by the players via a communication line, the device comprising:
circuitry configured to
enable, via a display of a terminal device of a first player, identification of one or more of the players as a candidate player supposed to participate in a second group, in association with information identifying one or more groups in which the one or more of the players currently belongs to,
receive, from at least one of terminal devices of the one or more of the players, a notification on acceptance of participation in the second group,
determine whether a number of players supposed to participate in the second group reaches a predetermined number based on the notification,
update and store the second group as a current group for the players supposed to participate in the second group, when the number of players supposed to participate in the second group reaches the predetermined number, and
permit the one or more of the players to continue to participate in the one or more groups to which the one or more of the players currently belong until the number of players supposed to participate in the second group reaches the predetermined number.

14. The device according to claim 13, wherein attribute information of the players supposed to participate in the second group is updated to the second group respectively, from the one or more groups which the players currently belong to, when updating the second group as the current group for the players supposed to participate in the second group.

15. The device according to claim 13, wherein the circuitry is configured to before receiving the notification on acceptance of participation in the second group, send invitations for participation in the second group to terminal devices of the one or more of the players.

16. The device according to claim 15, wherein the circuitry is configured to when a second player receives two or more invitations for participation from two or more players who created second groups respectively, set a latest second group as the current group of the second player, based on the second player's acceptance, the latest second group corresponding to a latest invitation from the two or more invitations.

17. The device according to claim 13, wherein the circuitry updates and stores the second group as the current group for the players supposed to participate in the second group, based on an instruction from the first player, after the predetermined number is achieved.

18. The device according to claim 13, wherein the circuitry updates and stores the second group as the current group for the players supposed to participate in the second group, when a certain time has elapsed since the predetermined number is achieved.

\* \* \* \* \*